(12) United States Patent
Fournier, Jr.

(10) Patent No.: US 6,205,668 B1
(45) Date of Patent: Mar. 27, 2001

(54) PROTECTIVE COVER FOR A CARPENTER'S HAND PLANE

(76) Inventor: Joseph P. Fournier, Jr., 20 Halsey Ave., Somerset, MA (US) 02725

( * ) Notice: Subject to any disclaimer, the term of this patent is extended or adjusted under 35 U.S.C. 154(b) by 0 days.

(21) Appl. No.: 09/329,651

(22) Filed: Jun. 9, 1999

(51) Int. Cl.[7] .............................. B65D 61/00; B27G 17/02
(52) U.S. Cl. ......................... 30/478; 30/286; 144/251.1; 206/349
(58) Field of Search .................. 30/286, 478; 144/251.1; 206/349

(56) References Cited

U.S. PATENT DOCUMENTS

| | | |
|---|---|---|
| 1,958,600 | 5/1934 | Wright . |
| 2,049,718 | 8/1936 | Pearson . |
| 2,232,409 * | 2/1941 | Salzsieder ............................. 30/478 |
| 3,172,202 | 3/1965 | Sooter . |
| 4,373,628 * | 2/1983 | Dantes ................................. 30/478 |
| 4,476,630 | 10/1984 | Byrne . |
| 4,777,722 | 10/1988 | Trotta . |

* cited by examiner

Primary Examiner—Hwei-Siu Payer
(74) Attorney, Agent, or Firm—Salter & Michaelson

(57) ABSTRACT

A protective cover for a carpenter's plane includes a base plate having an upper surface and a width which is substantially similar to a width of the carpenter's plane and opposing side walls having a lower portion attached to opposing edges of the base plate and which extend away from the opposing edges of the base plate to an upper portion of the side walls, the side walls tapering inwardly, toward each other, as they extend away from the base plate. The cover is constructed such that when the cover is in an installed position on the plane, the upper portions of the side walls are flexed outwardly by the plane, resulting in an inward force being applied to the plane by the upper portions of the side walls, the inward force thereby holding the cover in place on the plane. When the cover is in the installed position on the plane, the base plate is operative for covering a cutting iron of the plane.

16 Claims, 5 Drawing Sheets

PROTECTIVE COVER FOR A CARPENTER'S HAND PLANE

BACKGROUND OF THE INVENTION

1. Field of the Invention

The present invention relates generally to construction tools, and more particularly to a protective cover for a carpenter's hand plane which allows the plane to be stored without retracting the cutting iron into the plane.

2. Discussion of the Related Art

Carpenter's hand planes are used quite frequently for a large number of different projects. Generally, as shown in FIG. 1, a carpenter's hand plane, generally indicated at 10, includes a sole 12, including a smooth bottom surface, a tote 14 and a front knob 16 for handling the plane 10, and a cutting assembly, including a cutting iron 18, a cap iron 20, a lever cap 22, an adjustment knob 24 and an adjustment lever 26. Adjustment knob 24 and lever 26 operate to adjust the position of the cutting iron 18 through a throat or slot (not shown) in the sole 12 of the plane 10.

In use, the cutting iron is positioned so that it protrudes outwardly from the sole approximately 1/32" to 1/16". When the plane is not in use, the cutting iron 18 is retracted into the sole 12 in order to protect the cutting iron 18. In order for the plane to work properly, the cutting iron must be kept extremely sharp. This is the reason that the cutting iron 18 must be retracted into the sole 12 when the plane is not in use. However, due the precise tolerances necessary for proper operation of the plane 10, it can become tedious and time-consuming to have to re-measure and adjust the extension of the cutting iron 18 every time the plane is to be used. Furthermore, even with the cutting iron 18 fully retracted, the possibility of damage to the cutting iron 18 still exists, especially when the plane 10 is stored with other tools, as the other tools could still damage the cutting iron by extending through the throat of the sole 12 and into contact with the cutting iron 18. These other tools could also damage the bottom surface of the sole 12, which can adversely affect the operation of the plane 10.

What is needed therefore is a device which eliminates the need for retracting the cutting iron after every use and which also protects the cutting iron and the sole of the plane from damage.

SUMMARY OF THE INVENTION

The present invention includes a protective cover for a carpenter's hand plane. The protective cover comprises a rectangular base plate having dimensions which are substantially similar to the dimensions of the sole of a standard hand plane. Located along each of the long sides of the base plate are side walls which taper inwardly as they extend from the base plate. In use, the sole of the plane is aligned with the end of the protective cover and is then slid onto the base plate between the side walls of the cover. Due to the tapering of the side walls, the sole of the plane is wedged between the side walls, thereby holding the cover on the plane due to the friction between the side walls and the sole. The cover may include a recess in which the cutting iron resides when the cover is installed on the plane and the recess may include a number of ridges with which the blade interfaces in order to keep the cover from sliding off of the sole of the plane. The protective cover eliminates the need to retract the cutting iron and also protects the bottom of the sole.

According to one embodiment of the invention, a protective cover for a carpenter's plane is disclosed. The cover includes a base plate having an upper surface and a width which is substantially similar to a width of the carpenter's plane and opposing side walls having a lower portion attached to opposing edges of the base plate and which extend away from the opposing edges of the base plate to an upper portion of the side walls, the side walls tapering inwardly, toward each other, as they extend away from the base plate. The cover is constructed such that when the cover is in an installed position on the plane, the upper portions of the side walls are flexed outwardly by the plane, resulting in an inward force being applied to the plane by the upper portions of the side walls, the inward force thereby holding the cover in place on the plane. When the cover is in the installed position on the plane, the base plate is operative for covering a cutting iron of the plane.

The base plate includes a recess formed in the upper surface thereof, the recess being constructed and arranged for receiving the cutting iron of the plane when the protective cover is in the installed position. The base plate further includes a number of ridges disposed on a lower surface of the recess, the number of ridges lying transverse to the opposing side walls and being constructed and arranged for engaging the cutting iron when the cover is in the installed position.

According to another embodiment of the invention, the combination of a carpenter's hand plane and a protective cover for the carpenter's hand plane is disclosed, the carpenter's hand plane comprising a sole having a cutting iron protruding through a throat in the sole. The protective cover comprises a base plate having an upper surface and a width which is substantially similar to a width of the carpenter's plane and opposing side walls having a lower portion attached to opposing edges of the base plate and which extend away from the opposing edges of the base plate to an upper portion of the side walls.

Other features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION

Figure 1:
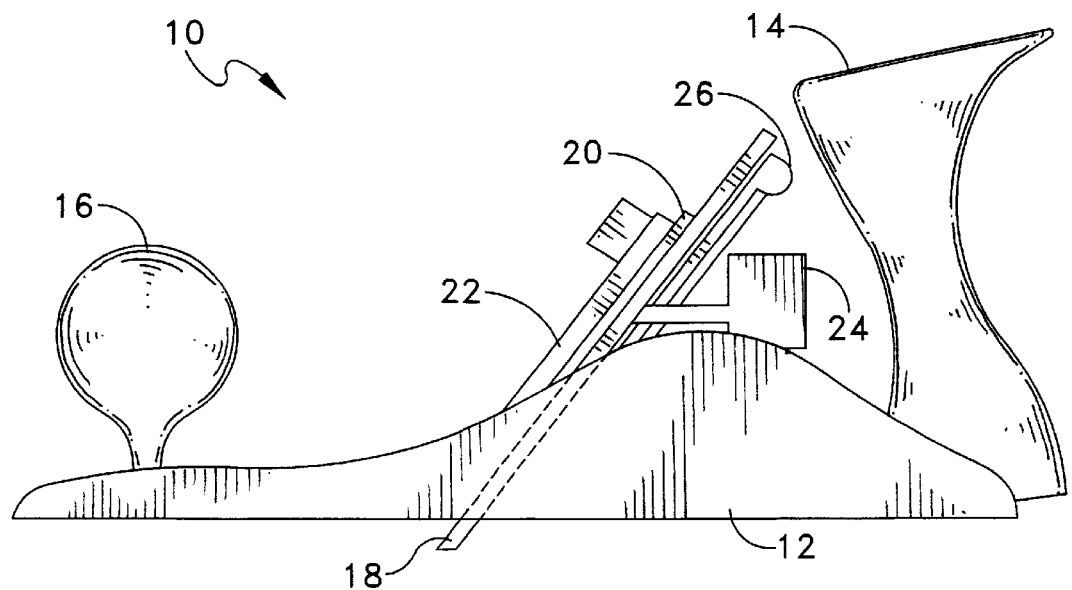
FIG. 1 is a side view of a conventional carpenter's hand plane.

Referring now to the figures, and particularly FIG. 2, the protective cover, generally indicated at 30, will now be described. The cover 30 includes a rectangular base plate 32, including an upper surface 32a, and opposing longitudinal side walls 34a and 34b. The width of the base plate 32 corresponds to the width of the plane onto which the cover 30 will be mounted. Accordingly, it will be understood that the cover 30 may be formed in a variety of widths to accommodate planes of different widths. Regarding the length of the cover 30, while it is preferable that the cover 30 cover the entire length of the sole 12, it is acceptable to have the cover be shorter or longer than the sole 12.

Figure 2:
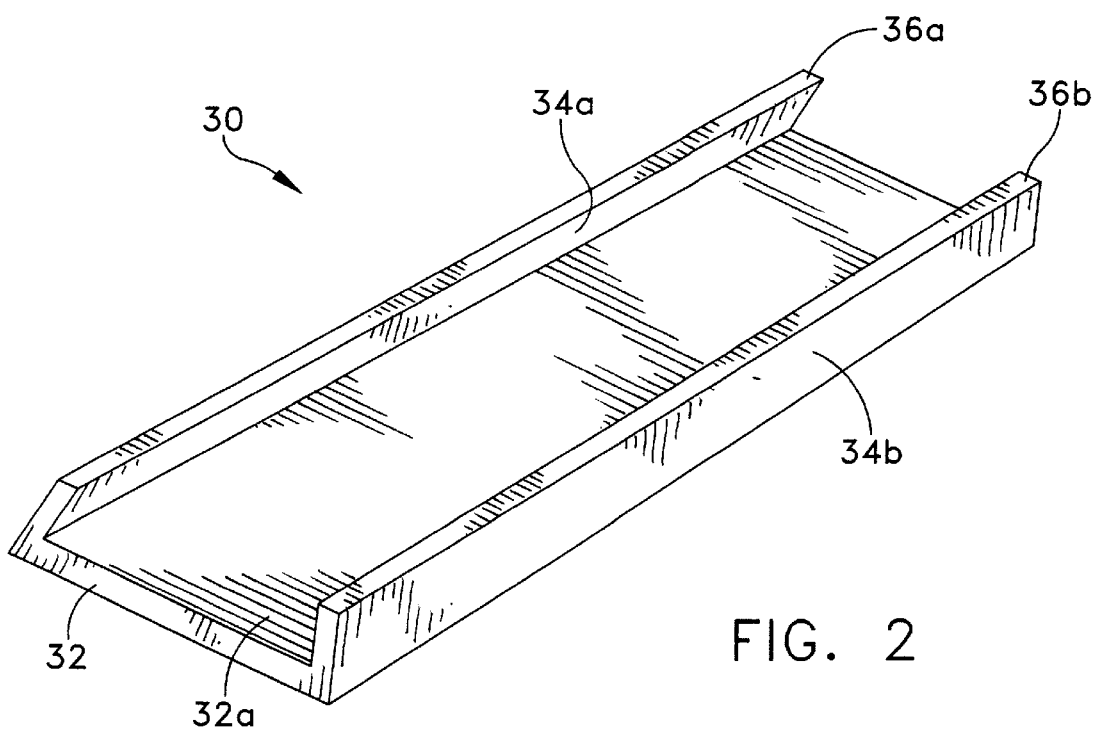
FIG. 2 is a perspective view of a first embodiment of the protective cover in accordance with the present invention.

As can be seen from FIG. 2, side walls 34a and 34b are formed such that they taper inwardly as they extend away from the base plate 32. Accordingly, the distance between the top portions 36a and 36b of side walls 34a and 34b, respectively, is less than the width of the base plate 32 at the junction of the side walls 34a and 34b and the base plate 32.

Cover 30 is preferably formed of a plastic or rubber material which is injection molded in a single piece. While the material used in the manufacture of the cover 30 is a hard material, as described below with reference to FIG. 3, it is necessary for the cover to somewhat flexible to enable the side walls 34a and 34b to flex away from each other in order to enable the sole 12 of the plane 10 to be frictionally fit therebetween.

Figure 3:
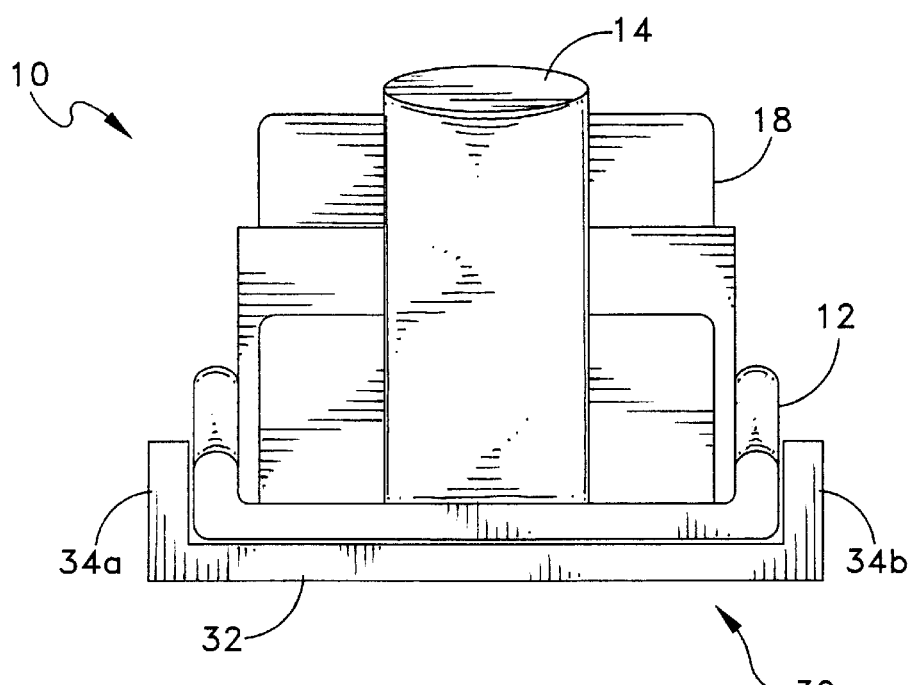
FIG. 3 is a rear view of a carpenter's hand plane installed on the protective cover of the present invention.

Shown in FIG. 3 is a rear view of the plane 10 mounted in the cover 30. In order to mount the cover 30 on the plane 10, the rear or tote-end of the sole 12 of the plane 10 is aligned between the side walls 34a and 34b at one end of the cover 30, thereby forcing the top portions 36a and 36b of side walls 34a and 34b away from each other. The plane 10 is then slide onto the cover 30 by pulling the plane along the length of the cover such that the sides of the sole press the top portions 36a and 36b of side walls 34a and 34b, respectively, outwardly along the entire length of the plane 10. Since the cutting iron 18 extends from the sole 12, the plane must be slid along the cover 30 in a direction opposite the direction that the plane is moved during a planing operation. To remove the cover 30 from the plane 10 the plane is slid of off the cover 30 in the same direction used to install the cover.

Referring to FIG. 3, it can be seen that, in the installed position, the side walls 34a and 34b are substantially perpendicular to the base plate 32. Due to the original inward taper of the side walls 34a and 34b, the cover 30 is held in place on the sole 12 of the plane 10 by a friction fit between the side walls 34a and 34b and the sides of the sole 12. In this position, the cutting iron engages the upper surface 32a and is completely covered and thus protected from damage. Furthermore, the smooth bottom surface of the sole 12 is covered, thus protecting the sole from damage. The inward taper of the side walls 34a and 34b, aside from imparting a frictional force against the sole 12 to hold the cover 30 in place, also enable the cover 30 to accommodate planes having slightly different widths.

Figure 4:
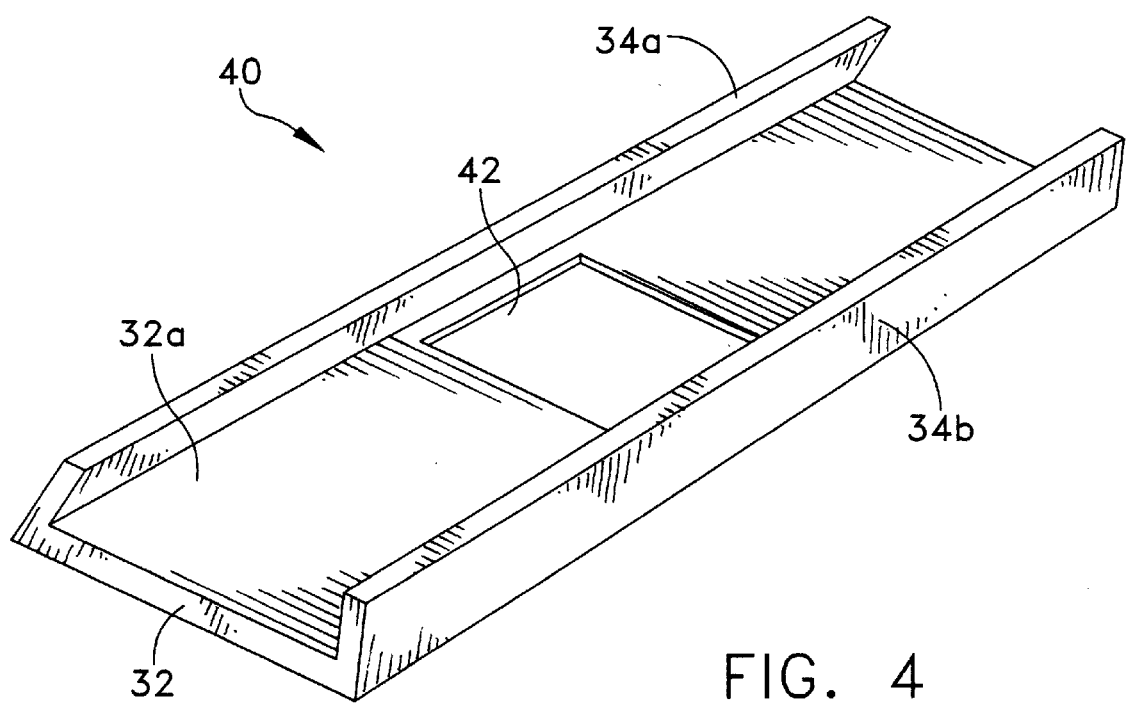
FIG. 4 is a perspective view of a second embodiment of the protective cover in accordance with the present invention.

Referring now to FIG. 4, a second embodiment of the invention will be described. Components which are the same as those shown in the embodiment of FIG. 2 are indicated by like reference numerals. Shown in FIG. 4 is a protective cover, generally indicated at 40, which includes a recess 42 formed in the upper surface 32a of the base plate 32.

The recess 42 is operative for receiving the cutting iron 18 when the cover 40 is installed on the plane 10. The recess 42 has a depth which substantially corresponds to the maximum extension of the cutting iron 18 from the bottom surface of the sole 12. When the cover 40 is installed on the plane 10, in the manner described above, the extended cutting iron is disposed in the cavity 42. While the cavity 42 is shown as being square in shape in FIG. 4, it will be understood that it may also be rectangular, the only limitation in that size of the recess being that it has a width which is slightly wider than the cutting iron 18.

Figure 5:
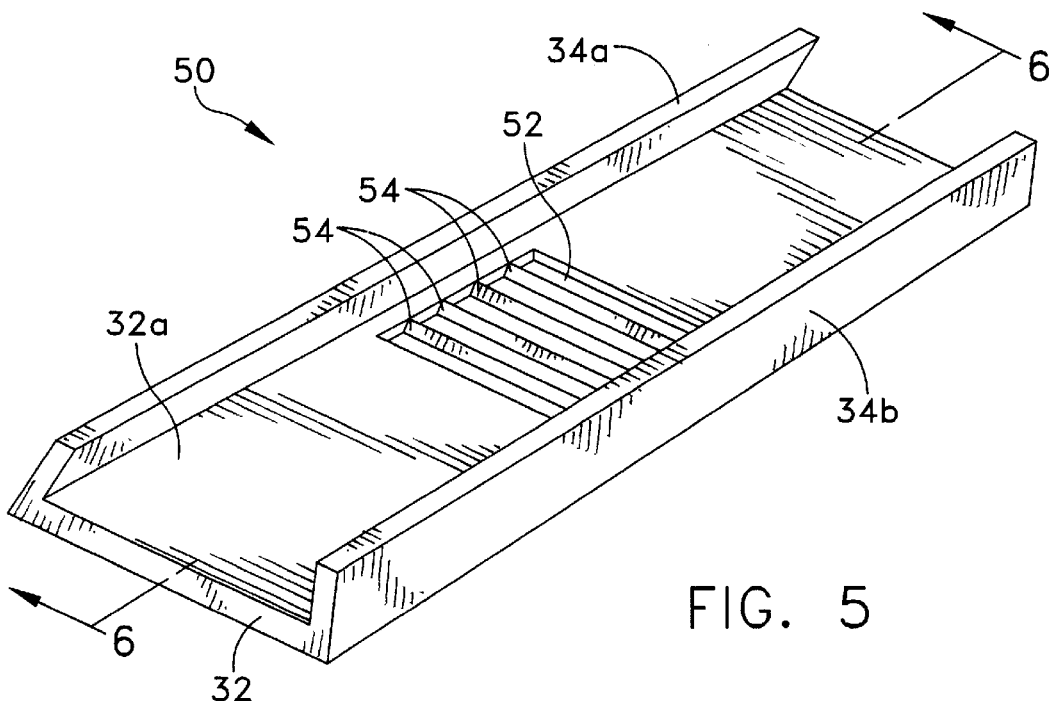
FIG. 5 is a perspective view of a third embodiment of the protective cover in accordance with the present invention.

Referring now to FIG. 5, a third embodiment of the invention will be described. Components which are the same as those shown in the embodiment of FIG. 2 are indicated by like reference numerals. Shown in FIG. 5 is a protective cover, generally indicated at 50, which includes a recess 52 formed in the upper surface 32a of the base plate 32. Disposed within recess 52 are a number of ridges 54 which extend across the width of the recess 52 in an upward direction. Shown in FIG. 6 is a cross-sectional view of the cover 50, taken along lines 6—6 in FIG. 5.

Figure 6:
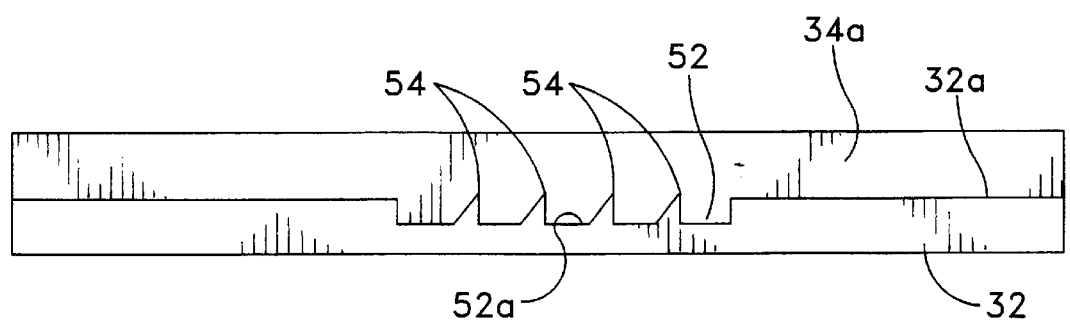
FIG. 6 is a cross-sectional view of the protective cover shown in FIG. 5, taken along line 6—6 of FIG. 5.

As can be seen in FIG. 6, ridges 54 extend from the bottom surface 52a of recess 52 to a point which is substantially in the plane formed by the surface 32a of base plate 32. The recess 52 is operative for receiving the cutting iron 18 when the cover 50 is installed on the plane 10. The recess 52 has a depth which substantially corresponds to the maximum extension of the cutting iron 18 from the bottom surface of the sole 12. When the cover 50 is installed on the plane 10, in the manner described above, the extended cutting iron is disposed in the cavity 52. The ridges 54 further secure the cover 50 in place on the plane, since the cutting iron 18, by residing between and engaging the ridges 54, further prevents the plane 10 from being slid relative to the cover 50. While the cavity 52 is shown as being square in shape in FIG. 5, it will be understood that it may also be rectangular, the only limitation in the size of the recess being that it has a width which is slightly wider than the cutting iron 18. Furthermore, any number of ridges may be formed within cavity 52. Also, although the ridges 54 shown in FIGS. 5 and 6 are triangular in cross-section, it will be understood that any shape ridges, such as rectangular, semi-spherical, etc., may be used in the formation of the ridges 54.

Figure 7:
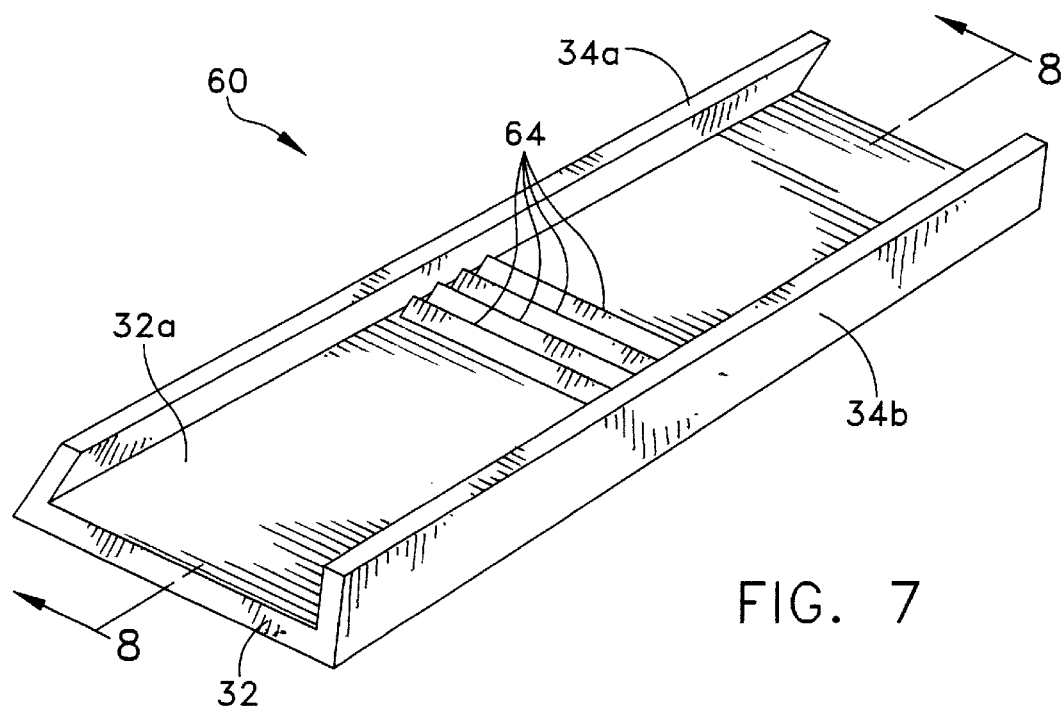
FIG. 7 is a perspective view of a fourth embodiment of the protective cover in accordance with the present invention.

Referring now to FIG. 7, a fourth embodiment of the invention will be described. Components which are the same as those shown in the embodiment of FIG. 2 are indicated by like reference numerals. Shown in FIG. 7 is a protective cover, generally indicated at 60, which includes a number of ridges 64 which extend across the width of the cover 60 in an upward direction. Shown in FIG. 8 is a cross-sectional view of the cover 60, taken along lines 8—8 in FIG. 7.

Figure 8:
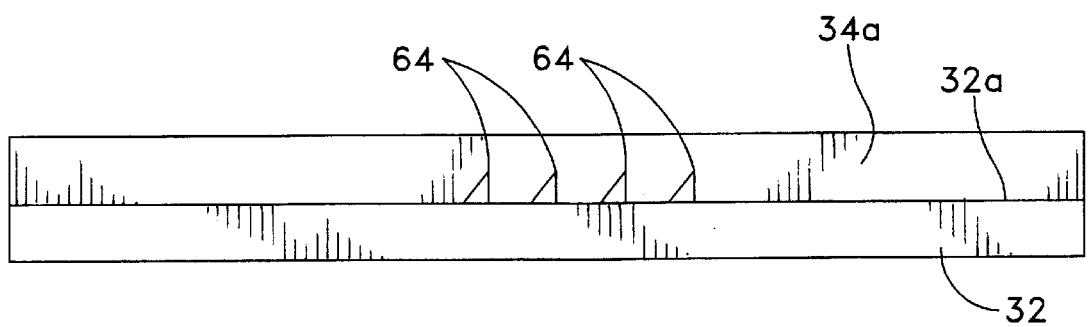
FIG. 8 is a cross-sectional view of the protective cover shown in FIG. 7, taken along line 8—8 of FIG. 5.

As can be seen in FIG. 8, ridges 64 extend upwardly from the upper surface 32a of base plate 32. The ridges 64 are operative for receiving the cutting iron 18 when the cover 60 is installed on the plane 10. When the cover 60 is installed on the plane 10, in the manner described above, the extended cutting iron is disposed between the ridges 64 to secure the cover 60 in place on the plane, since the cutting iron 18, by residing between and engaging the ridges 64, prevents the plane 10 from sliding relative to the cover 60. Any number of ridges 64 may be formed on the base plate 32. Also, although the ridges 64 shown in FIGS. 7 and 8 are triangular in cross-section, it will be understood that any shape ridges, such as rectangular, semi-spherical, etc., may be used in the formation of the ridges 64.

Based on the foregoing, it can therefore be seen from the above that the present invention provides a protective cover for a carpenter's hand plane which eliminates the need to retract the cutting iron when the plane is not in use. The protective cover protects both the cutting iron and the sole from damage when the plane is not in use. The protective cover is simple to use and inexpensive to manufacture.

While there is shown and described herein certain specific structure embodying the invention, it will be manifest to those skilled in the art that various modifications and rearrangements of the parts may be made without departing from the spirit and scope of the underlying inventive concept. For example, while the invention is described as being formed of plastic or rubber which is injection molded, it will be understood that any material and manufacturing method may be used in the manufacture of the apparatus. Accordingly, the inventive concept is not limited to the particular forms herein shown and described except insofar as indicated by the scope of the appended claims.

What is claimed is:

1. A protective cover for a carpenter's plane, the cover comprising:

a base plate having an upper surface and a width which is substantially similar to a width of the carpenter's plane; and opposing side walls having a lower portion attached to opposing edges of said base plate and which extend away from said opposing edges of said base plate to an upper portion of said side walls, said side walls tapering inwardly, toward each other, as they extend away from said base plate;

said cover being constructed and arranged such that when said cover is in an installed position on the plane, the upper portions of the side walls are flexed outwardly by the plane, resulting in an inward force being applied to the plane by the upper portions of the side walls, said inward force thereby holding said cover in place on the plane; and wherein, when said cover is in the installed position on the plane, the base plate is operative for covering a cutting iron of the plane.

2. The protective cover of claim 1, wherein said base plate comprises a recess formed in said upper surface thereof, said recess being constructed and arranged for receiving the cutting iron of the plane when the protective cover is in the installed position.

3. The protective cover of claim 2, further comprising a number of ridges disposed on a lower surface of said recess, said number of ridges lying transverse to said opposing side walls and being constructed and arranged for engaging the cutting iron when the cover is in the installed position.

4. The protective cover of claim 3, wherein said plurality of ridges are triangular in cross-section.

5. The protective cover of claim 1, further comprising a number of ridges disposed on said base plate, said number of ridges lying transverse to said opposing side walls and being constructed and arranged for engaging the cutting iron when the cover is in the installed position.

6. The protective cover of claim 1, wherein said cover comprises a plurality of ridges, and wherein, in said installed position, the cutting iron of the plane is received between adjacent ridges.

7. The protective cover of claim 6, wherein said plurality of ridges are triangular in cross-section.

8. The protective cover of claim 1, wherein said cover is formed from a plastic material.

9. The protective cover of claim 1, wherein said base plate is rectangular in shape and said opposing side walls are disposed along longitudinal edges of said base plate.

10. In combination, a carpenter's hand plane and a protective cover for the carpenter's hand plane, the carpenter's hand plane comprising a sole having a cutting iron protruding through a throat in the sole, the protective cover comprising:

a base plate having an upper surface and a width which is substantially similar to a width of the carpenter's plane; and opposing side walls having a lower portion attached to opposing edges of said base plate and which extend away from said opposing edges of said base plate to an upper portion of said side walls;

wherein, when said cover is in an installed position on the plane, the base plate is operative for covering said cutting iron of the plane; and said side walls of said protective cover taper inwardly, toward each other, as they extend away from said base plate.

11. The combination of claim 10, said cover being constructed and arranged such that when said cover is in the installed position on the plane, the upper portions of the side walls are flexed outwardly by the sole of the plane, resulting in an inward force being applied to the sole of the plane by the upper portions of the side walls, said inward force thereby holding said cover in place on the plane.

12. The combination of claim 11, wherein said base plate comprises a recess formed in said upper surface thereof, said recess being constructed and arranged for receiving the cutting iron of the plane when the protective cover is in the installed position.

13. The combination of claim 12, further comprising a number of ridges disposed on a lower surface of said recess, said number of ridges lying transverse to said opposing side walls and being constructed and arranged for engaging the cutting iron when the cover is in the installed position.

14. The combination of claim 10, further comprising a number of ridges disposed on said base plate, said number of ridges lying transverse to said opposing side walls and being constructed and arranged for engaging the cutting iron when the cover is in the installed position.

15. The combination of claim 14, wherein said number of ridges are triangular in cross-section.

16. The combination of claim 10, wherein said cover comprises a plurality of ridges, and wherein, in said installed position, the cutting iron of the plane is received between adjacent ridges.

* * * * *